3,032,429
GLASS
Edwin P. Arthur, Fullerton, Calif., assignor to Beckman Instruments, Inc., a corporation of California
No Drawing. Filed May 31, 1960, Ser. No. 32,609
2 Claims. (Cl. 106—52)

This invention relates to a new and improved glass and, in particular, to a lead-free, silicate glass having a relatively low melting point, good working characteristics, and high ionic mobility.

It is conventional to use lead to lower the melting point of a ceramic mixture and to improve the working characteristics of the glass fused therefrom. However, some applications of glasses require that no lead be present in the glass. Also, there is on occasion a need for a glass having only a single alkali metal, such as potassium or one of the heavier alkali metals of group I of the periodic table, to allow for high ionic mobility in the glass. Conventional multiple alkali glasses melt at relatively low temperatures but exhibit very low ionic mobility, especially for alkali metals as heavy as potassium and heavier.

Potassium, styled chemically as potassium oxide $K_2O$ and referred to as potash, has long been used in glass making but has not been very satisfactory as a sole alkali metal. In previous efforts to make a lead-free, single alkali glass, if sufficient potassium is used to reduce the viscosity of the glass for a suitable working condition, the resultant glass is unstable; whereas a stable glass using a lower quantity of potash is so viscous as to be unworkable. It is of interest to note that not a single such glass is listed in the comprehensive review in the American Chemical Society Monograph No. 77, "Properties of Glass," Morey (Reinhold).

Accordingly, it is an object of this invention to provide a lead-free silicate glass that is readily melted, stable, and easily worked. A further object is to provide such a glass made from a prefusion mixture containing only a single alkali metal at least as heavy as potassium. It is another object to provide a lead-free glass having only a single alkali metal introduced in the form of a potassium salt representing not more than about thirty-five percent by weight of the prefusion mixture. A specific object is to provide such a glass wherein the potassium salt in the prefused batch mixture is potassium carbonate.

It is another object of the invention to provide a lead-free, alkali glass that has high ionic mobility and is easily fabricated into thin membranes of a millimeter or less thick. A further object is to provide such a glass that may be easily worked, as by blowing, pressing, or the like, and which may readily be joined to other components formed of standard compositions of glasses. It has been found that a silicate glass having no lead and a substantial quantity of alkali metal can be made and will have these desired properties.

The silicate fraction of the prefused batch preferably comprises pure silica sand having a small quantity of titanium dioxide mixed therewith. The presence of titanium dioxide tends to lower the temperature required for fusion of the mixture. The particular quantity of titanium dioxide utilized can be varied somewhat to change the melting temperature of fusion and is preferably used in a ratio of about ten parts of silica to one part of titanium dioxide, by weight.

The alkaline earth fraction is comprised of calcium introduced in the form of calcium hydroxide, calcium carbonate or a mixture of the two, and serves to make the product a stable glass. Preferably, this fraction also includes a metal oxide from the lanthanide series, such as lanthanum oxide, which improves both viscosity for melting and working and also adds to the stability of the glass with respect to the water vapor of air and various aqueous media as well as gases and the like.

The alkali fraction is introduced into the prefusion mixture in the form of a metal salt, preferably potassium carbonate, although other salts may be used, i.e., potassium nitrate, and rubidium, and cesium carbonates and nitrates. But only a single alkali metal is used, except for small traces of others which may be present as impurities.

In a particular embodiment of the glass, the following prefusion composition was used, the proportions being given in parts by weight: silica sand 12.00, titanium dioxide 1.20, calcium hydroxide 1.59, lanthanum oxide 2.64, and potassium carbonate 7.68. This mixture provides a stock that is melted with ease in a platinum-lined Alundum crucible and which can be refined bubble-free at moderate conventional temperatures in the order of 1400° C. The resultant glass is very stable and is easily reworked into strong membranes which can be mounted on stems or tubes of other compositions without devitrification. The composition of the resultant glass as calculated from the prefusion mixture is set out in Table I.

Table I

|  | Mol percent | Weight percent |
| --- | --- | --- |
| $SiO_2$ | 66 | 53.9 |
| $TiO_2$ | 5 | 5.4 |
| $CaO$ | 7 | 5.4 |
| $La_2O_3$ | 3 | 11.8 |
| $K_2O$ | 19 | 23.5 |

A spherical membrane of a thickness of about two-tenths of a millimeter was formed by blowing. The membrane was joined by a fusion seal to a lead glass stem of Corning 0010. The membrane had a D.C. electrical resistance of about one ohm per square centimeter at 350° C.

The above mixture provides a workable, stable silicate glass having between twenty and thirty per cent by weight of potash with potassium essentially the sole alkali present. The word "essentially" is used in the specification and claims hereof because of the near impossibility of obtaining completely pure constituents, i.e., any single alkali salt will contain trace amounts of other alkalis. Because of the instability of high potash glasses, it is preferred to keep the prefusion potash content below thirty-five percent by weight.

It will be understood that variations and modifications of the specific figures disclosed and discussed herein may be made without necessarily departing from the spirit of the invention, the scope of which is defined by the claims thereof.

I claim as my invention:

1. A potassium silicate glass made from a prefusion mixture consisting essentially, in parts by weight, of silica about 12.0, titanium dioxide about 1.2, calcium hydroxide about 1.6, lanthanum oxide about 2.6, and potassium carbonate about 7.7.

2. A lead-free silicate glass having essentially only a single alkali metal and made from a prefusion mixture, consisting essentially, in percent by weight, of potassium carbonate about twenty to thirty-five percent, calcium hydroxide about six percent, lanthanum oxide about ten percent, and the remainder silica and titanium dioxide in a ratio by weight of about ten to one.

References Cited in the file of this patent
UNITED STATES PATENTS

| | | |
|---|---|---|
| 2,481,701 | Sun | Sept. 13, 1949 |
| 2,497,235 | Perley | Feb. 14, 1950 |
| 2,611,712 | Ford | Sept. 23, 1952 |
| 2,805,166 | Loffler | Sept. 3, 1957 |
| 2,901,365 | Seymour et al. | Aug. 25, 1959 |